United States Patent [19]

Matijevic et al.

[11] Patent Number: 5,344,489
[45] Date of Patent: Sep. 6, 1994

[54] SYNTHETIC, MONODISPERSED COLOR PIGMENTS FOR THE COLORATION OF MEDIA SUCH AS PRINTING INKS, AND METHOD AND APPARATUS FOR MAKING SAME

[75] Inventors: Egon Matijevic; Wan P. Hsu, both of Potsdam, N.Y.; Manfred R. Kuehnle, Waldesruh, P.O. Box 1020, Rte. 103A, New London, N.H. 03257

[73] Assignee: Manfred R. Kuehnle, New London, N.H.

[21] Appl. No.: 792,713

[22] Filed: Nov. 15, 1991

[51] Int. Cl.$^5$ ............................................. C09C 1/36
[52] U.S. Cl. .................... 106/442; 106/447; 106/483; 106/482; 106/491; 427/219; 427/220
[58] Field of Search ............... 106/491, 483, 482, 447, 106/442; 427/218, 219, 220

[56] References Cited

U.S. PATENT DOCUMENTS

| | | | |
|---|---|---|---|
| 4,197,135 | 4/1980 | Bailey et al. | 106/23 |
| 4,210,916 | 7/1980 | Mansukhani | 346/1.1 |
| 4,523,953 | 6/1985 | Paffoni et al. | 106/23 |
| 4,566,908 | 1/1986 | Nakatani et al. | 106/308 |
| 4,689,078 | 8/1987 | Koike et al. | 106/22 |
| 4,705,567 | 11/1987 | Hair et al. | 106/20 |
| 4,861,379 | 8/1989 | Imai et al. | 106/402 |
| 4,877,451 | 10/1989 | Winnik et al. | 106/23 |
| 4,880,432 | 11/1989 | Egan et al. | 8/647 |
| 5,127,952 | 7/1992 | Persello et al. | 106/492 |

FOREIGN PATENT DOCUMENTS

137966 6/1988 Japan .
137967 6/1988 Japan .
WO9221726 3/1992 PCT Int'l Appl. .

OTHER PUBLICATIONS

Tentorio, Matijevic & Kratohvil, 26 *J. Colloid Interface Sci.* 62 (1986).
Gutoff & Swank, 76 *AIChE Symposium Series* 43 (1980).
Stöber, Fink & Bohn, 26 *J. Colloid Interface Sci.* 62 (1968).
Aiken, Hsu & Matijevic, 71 *J. Am. Ceram. Soc.* 845 (1988).
Allingham, Cullen, Giles, Jain & Woods, 8 *J. app. Chem.* 108 (1958).
Toon & Ackerman, 20 *Appl. Optics* 3657 (1981).
Van Helden, Jansen & Vrij, 81 *J. Colloid and Interface Sci.* 354 (1982).

*Primary Examiner*—Karl Group
*Assistant Examiner*—Chris Gallo
*Attorney, Agent, or Firm*—Cesari and McKenna

[57] ABSTRACT

A method of making synthetic color pigments comprises synthesizing monodispersed colloidal core particles by precipitation from a solution and applying dye material to the core particles either by adsorption directly into the core particles or by adsorption or incorporation into alumina fixation shells at the surfaces of the core particles. Additional functional shells may be applied to the dyed core particles for various reasons. The pigments are useful for the coloration of various media such as printing inks and paint compositions.

39 Claims, 12 Drawing Sheets

1μm

1μm 0.5μm 0.5μm 0.5μm 0.5μm

1μm

1μm

2μm

2μm

SYNTHETIC, MONODISPERSED COLOR PIGMENTS FOR THE COLORATION OF MEDIA SUCH AS PRINTING INKS, AND METHOD AND APPARATUS FOR MAKING SAME

This invention relates to a method of making synthetic color pigments for the coloration of various media particularly printing inks. It also relates to the pigments resulting from the practice of the method.

BACKGROUND OF THE INVENTION

In patent application Ser. No. 07/804,220, of even date herewith, entitled Electrothermal Printing Ink with Monodispersed Synthetic Pigment Particles and Method and Apparatus For Electronic Printing Therewith, a correlated novel printing ink is disclosed which offers superior image reproduction characteristics. The printing ink described in that application, the contents of which is hereby incorporated herein by reference, consists of a solid block of thermoplastic polymeric carrier material within which myriads of synthetic, monodispersed color pigments are embedded. These pigments of varied colors share essentially identical surface, bulk, and morphological properties, particularly their colorimetric and electrokinetic properties, in order to attain superior reproducible color representation in the printing materials obtained by that printing process.

The present invention concerns novel methods of controllably producing superior color pigments for that printing ink as well as for other coloration media through a series of manufacturing steps which lead to entirely predictable color values and surface charges for each and every pigment particle so as to achieve unprecedented manufacturing yield and quality of product. A variety of approaches to manufacturing these superior pigments is described by way of examples for the purpose of showing the broad basis of this invention.

PRIOR ART

Colors are imparted to various media by dissolving and/or absorbing organic dyes in them, or by mixing insoluble inorganic pigments into the media during their manufacture. The colored media may be applied as in a surface coating, such as paint or ink.

Printing is, of course, a method of selectively coloring a surface in accordance with a preconceived pattern. The inks used for this purpose consist of pigments, usually dissolved in an oil-based carrier which, together with all other ingredients, is "pressed" onto the media surface, such as paper, where it is dried to form an adherent deposit.

Electrophoretic toners also consist of pigments dispersed in an oil-based low viscosity carrier. The pigments used there are, however, given electrical charges so they can be attracted by electrical charges of opposite polarity on a substrate. When this takes place during an imaging procedure, the pigment particles migrate, driven by electrostatic attraction, towards the substrate surface in response to an imagewise electrical charge pattern applied thereto.

Thus, in both cases, printing and toning, as well as in other marking techniques such as ink jet and thermal printing, the pigments impart their color to the media. As a rule, then, pigments consist of poorly dispersed, agglomerated discrete particles whose approximate coloring effects are derived from the widely varying shape and size distributions throughout the carrier material to form deposits of given optical densities. Different colors and hues are then obtained by mixing quantities of different color pigments.

In the above-referenced patent application, however, the point is made that the purity and predictability of a color ink relates quite specifically to the particular size, shape, and morphology of the ink pigment particles. Conventional pigment particles range widely in size and have irregular shapes. This is evident from FIGS. 1A to 1D which show conventional pigment particles of different colors under different magnifications. The particles in each sample vary greatly in size, shape and degree of agglomeration; therefore, their color quality suffers. Hence, to improve the color quality and predictability of printing inks and other coatings, it is desirable to produce synthetic color pigments which excel in their optical colorimetric and electrokinetic properties by being of

- narrow size distribution (monodispersed)
- identical shape (spherical)
- identical bulk property
- identical surface electrical properties (directly or through additives).

Heretofore, such uniform synthetic pigment particles have been difficult to manufacture in a controllable fashion. For example, the article by A. Tentorio, E. Matijevic and J. Kratohvil in J. Colloid Interface Sci. 26, 62 (1986) describes small dye-containing particles, such as aluminum hydrous oxide into which Mordant Blue 3 was incorporated. In another article, Gutoff and Swank (AIChE Symposium Series No. 193, Vol. 76 (1980) p. 43–51), organic dyes soluable in organic solvents were precipitated as spherical particles by addition of water. In still another work by Winnik and Keoshkerian (U.S. Pat. No. 4,877,451, Oct. 31, 1989), ink jet inks were prepared by binding dyes to surface modified silica particles. Other ink jet inks are also known; see, for example, U.S. Pat. Nos. 4,880,432; 4,197,135; 4,210,916; 4,566,908; 4,689,078 and 4,705,567. Each of the above disclosures is included herein by reference.

SUMMARY OF THE INVENTION

The present invention aims to provide a method of making synthetic, monodispersed color pigments whose particles are uniform in terms of geometry, composition and functional properties.

Another object of the invention is to provide a method of making such color pigments that have a high degree of color saturation and which can be modified by using readily available dyes or dye mixtures to any desired hue.

A further object of the invention is to provide a method of making a color pigment for use in an electrothermal printing ink incorporating a thermoplastic carrier material for the pigment.

A further object of the invention is to make particles whose inner material is furnished with a selected optical index of refraction so as to closely match the index of the carrier material in order to achieve near-complete visual transparency of the particle/carrier mixture.

Yet another object of the invention is to provide a method of making high quality color pigments on an economical production line basis.

Still another object is to provide improved synthetic color pigments whose particles have substantially identical size, shape, chemistry and functional properties.

A further object of the invention is to provide a color pigment whose individual particles can be colored uniformly to achieve any desired hue.

Another object of the invention is to provide a color pigment which has superior opacity and ability to hide an underlying substrate.

Yet another object of the invention is to provide functional coatings incorporating pigments having one or more of the above advantages.

Other objects will be obvious and will, in part, appear hereinafter. The invention accordingly comprises several steps and the mutual relation of one or more of such steps with respect to each of the others and the products possessing the features, properties and relation of elements, which are exemplified in the following detailed description, and the scope of the invention will be indicated by the claims.

According to this invention, specific procedures have been devised which allow controlled production of synthetic color pigments of the desired color hue or optical density coupled with outstanding color purity.

The present invention has application to the coloration of a variety of different media such as inks, toners, paints, fibers, plastics and pigmented surface coatings. However, we will describe the invention specifically with reference to thermoplastic printing inks of the type used in the printing process detailed in the above-referenced application.

As described there, the pigment particles are uniformly and densely embedded in a polymer carrier material. In the course of the printing process, the carrier material is melted at an elevated temperature, and the molten ink is attracted by electrostatic fields emanating from an intermediate printing element, and eventually deposited image-wise in a dot pattern onto a printing substrate such as paper, where it solidifies and fuses instantaneously, due to a quick exchange of thermal energy with the substrate. The acceptability of the resultant printing depends upon the fidelity, in response to a digital input, of the final visual color impression derived from different superimposed multilayer ink deposits on the substrate, residing congruently on each print dot and acting visually in concert.

The acceptability of the congruent printing result depends on the transparency of the ink, as each color layer acts virtually as a filter absorbing or transmitting a band of light frequencies whose transmission window must meet certain stringent spectral requirements, particularly with regard to the other conjunctively acting color layers, the sum of which can product a "pure color" or, conversely, a "dirty color".

The acceptability of the printed result depends furthermore on the range of densities obtainable throughout the printed image, preferably ranging from 0 to 2.0 for each color, thus producing results far superior to offset color printing and directly comparable to photographic emulsion imagery.

To meet the above demanding goals, we have devised an ink which is a matrix of a special colloidal color pigment embedded uniformly in a solid, but meltable, carrier material made of a specific thermoplastic polymer.

The color pigment is composed of a multiplicity of pigment particles, which are substantially identical, each of which comprises a core, a color material in the core, on the core or in a layer of different material surrounding the core. In some cases, one or more additional layers or shells can be added on top of the core to impart selected properties or characteristics to the particles (optical, magnetic, conductive, etc.). In other words, each pigment particle is a "designer particle" having built right into it the color and properties desired for the pigment as a whole.

The formation of the particles in this fashion also means that their components can be tailored to optimize their particular functions. Thus, the material of the particle core which functions primarily as a support structure and constitutes the bulk of the particle may be selected primarily on the basis of its cost and ability to produce powders of the desired shapes and sizes. In general, the core particles should be inorganic, of exceedingly narrow size distribution (monodispersed), and preferably spherical in shape (although advantageous results can also be obtained with needle-like or platelet-like cores). Preferably also, the refractive index of the color coated core particles is formulated to closely match that of the surrounding carrier material so as to diminish light scattering effects. The color material, on the other hand, may be composed of an organic dye or mixture of dyes chosen to impart a selected hue to the pigment particle.

In some applications, e.g. subtractive color inks, it may be desirable for the pigment particles to be relatively transparent; in others, e.g. surface coatings on paints, the opacity or hiding power of the particles may be of some importance. Either of these characteristics can be designed into the pigments made in accordance with the techniques discribed herein.

As will be described in more detail later, the pigment particle cores are colloids usually produced by precipitation from supersaturated solutions. To produce pigments, organic dyes can be added during the formation of precipitates or the dyes can be reacted directly with the already formed cores or with cores coated with shells of different chemical composition. The so-produced pigments can be treated further to control properties such as the light, chemical and solvent fastness of the colloidal pigment, as well as its dispersibility in nonpolar media, such as polymer melt carriers. In a similar fashion, the surface charge of the pigment particles can be controlled and modified by using an appropriate charge control agent or by polymer coating so that the particles will respond, with the surrounding polymer carrier material, to the electric fields emanating from an image cylinder of a printer of the type described in the above-identified copending application.

As will become apparent, the process conditions (i.e. time, temperature, reactant concentrations, etc.) during the formation of the cores and shells comprising the pigment particles can be controlled very closely. As a result, the size, color, and other physical properties of those particles can be made quite uniform and repeatable enabling high volume production of the pigments.

The polymer carrier material used with our pigments is designed to meet the necessary chemical (thermoplastic), dielectric (permittivity), thermal (glass transition and melting temperature), optical (transmission, refractive index), and viscoelastic (molecular weight distribution) properties for the particular application, e.g. printing ink or paint. With respect to the latter application, the benefits of the present invention include significant savings in the volume of paint needed to effectively coat a given substrate (including the ability to dispense with a priming coat), elimination of toxic substances (such as heavy-metal oxides, which are often used to achieve certain color values in conventional paints), and the ability to attain novel hues. When the particles are provided with a suitable electrostatic charge, the actual process of painting can be assisted by applying a voltage to the substrate; indeed, the degree to which electrostatic charge assists the coating process is greatest in hard-to-reach surface features such as edges, points and ridges.

BRIEF DESCRIPTION OF THE DRAWINGS

For a fuller understanding of the nature and objects of the invention, reference should be made to the following detailed description, taken in connection with the accompanying drawing figures, in which.

DETAILED DESCRIPTION OF THE INVENTION

Figure 1A:
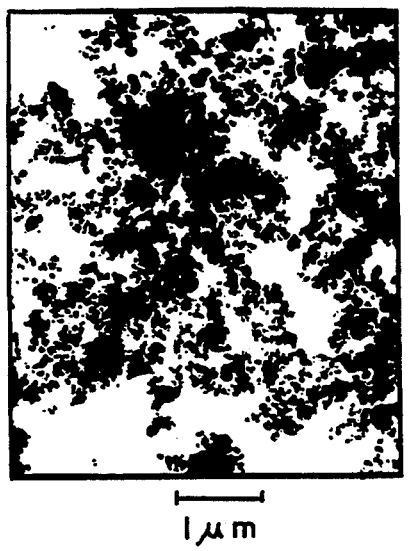
FIGS. 1A to 1D, already described, are inked reproductions of transmission electron micrographs of conventional printing ink pigments showing the irregular pigment particles therein.
Figure 1B:
Figure 1C:
Figure 1D:
Figure 2A:
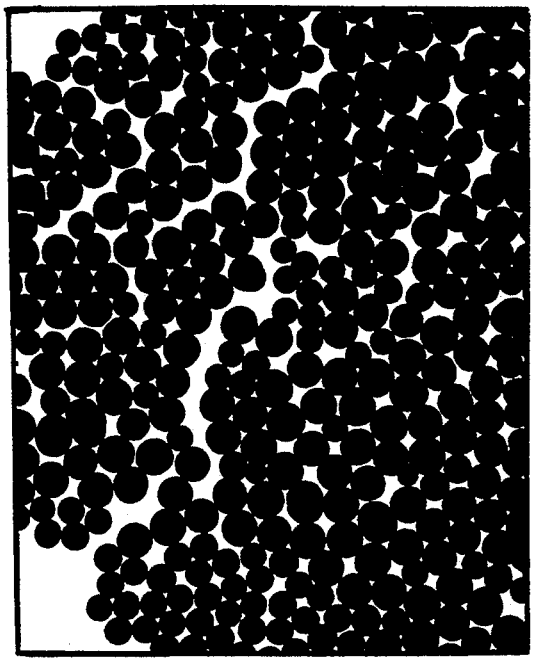
FIGS. 2A and 2B are inked reproductions of similar micrographs of pigments made in accordance with this invention.
Figure 2B:
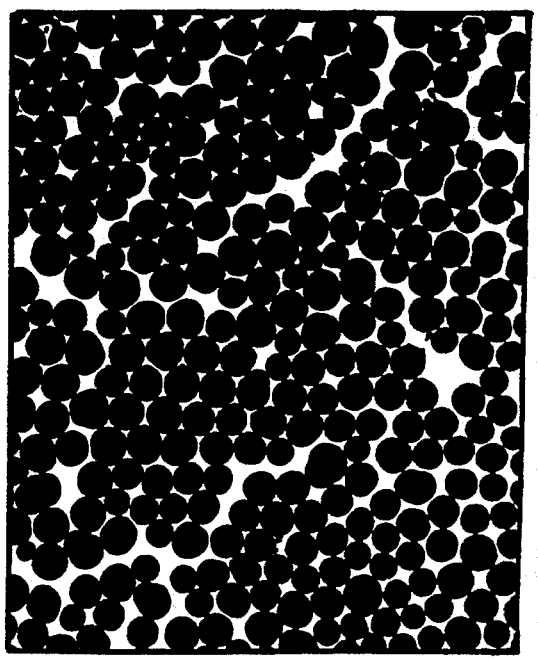
Figure 4A:
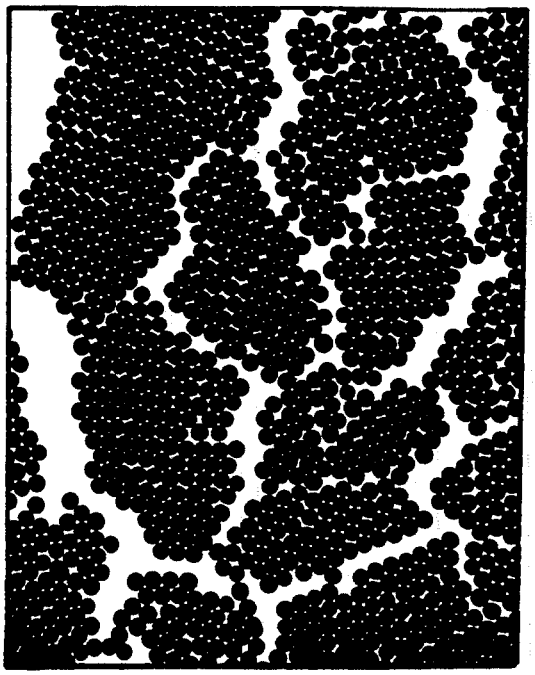
FIGS. 4A and 4B are inked reproductions of transmission electron micrographs depicting silica pigment cores made in accordance with this invention.
Figure 4B:
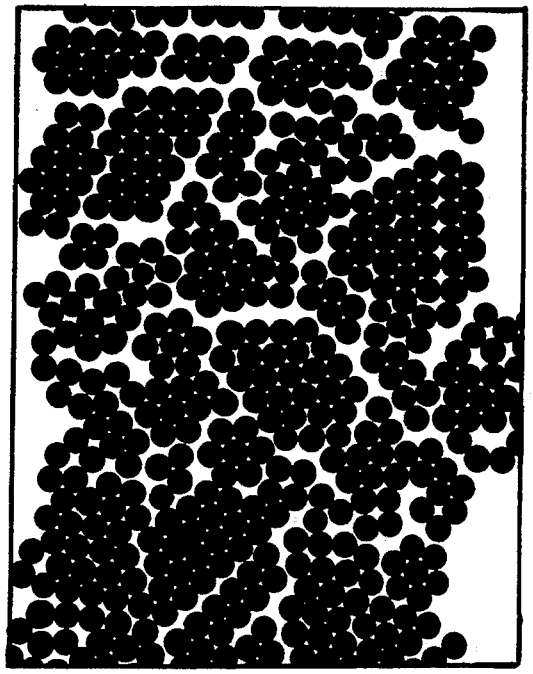

FIGS. 2A and 2B as well as FIGS. 4A and 4B show ink pigment particles made by our method. As seen there, the pigment particles are spherical and of uniform size in contrast to those of the commercial prior pigment shown in FIGS. 1A to 1D.

Figure 3A:
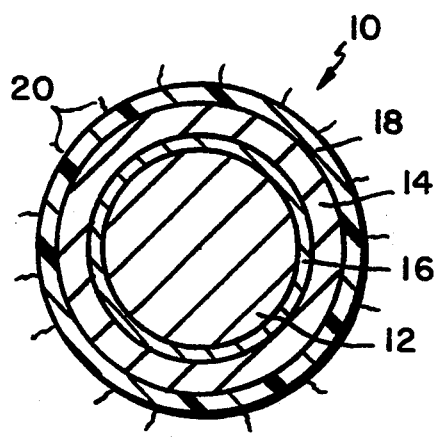
FIG. 3A is a schematic diagram showing an idealized cross-section of a pigment particle made according to this invention.

Those characteristics are due primarily to the mode of forming applicants' pigment particles, one of which suitable for a subtractive color ink, is idealized in FIG. 3A. The particle shown there and indicated generally at 10 has a central core 12 which effectively determines the overall size and shape of the particle. Core 12 may be of silica or one of the other materials described herein. Surrounding core 12 is a color layer 14 of a dye or dye mix which imparts a selected color or hue to each particle.

As will be described in the following examples, the surface of core 12 may be treated to provide a zone or layer 16 between the core and the dye layer 14 to encourage and optimize the formation of the dye layer on the core. Also, the pigment particle may be subjected to various surface treatments to form one or more layers 18 surrounding the dye layer to control factors such as light and chemical fastness, electrical charge on the particle, and the like.

Figure 3B:
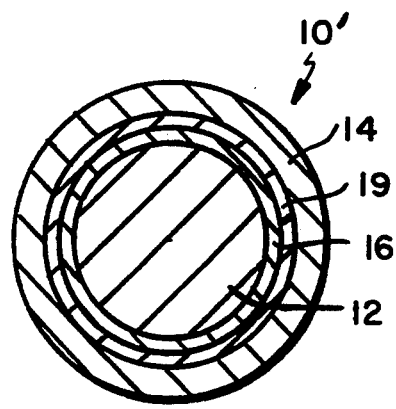
FIG. 3B is a similar diagram showing another pigment particle embodiment.

FIG. 3B illustrates an idealized color pigment particle 10 having high opacity and useful, for example, in a paint intended to hide an unsightly surface. Here, the core 12 is provided with a highly opaque shell or layer 19, e.g., of titania or magnesium, under the dye layer 14 so that light will not penetrate through the particle 10 or through a paint comprised of a myriad of such particles in a carrier.

A. Synthesis of The Particle Cores

The core particles can be made of different materials, such as synthetic inorganic colloids (silica, aluminum hydrous oxide, yttrium basic carbonate, and the like) and polymeric lattices. The latter have been used widely as toner carriers in many industrial applications. For our purposes here, the preferred core materials are uniform inorganic sols of silica, yttrium basic carbonate, and aluminum hydrous oxide. These are then interacted with different dyes to produce color pigments of precisely controlled properties.

A.1 Cores of Silica

One of the suitable core materials is silica powder consisting of uniform spherical particles of desired diameter. The preferred method of making the core particles is by precipitation of silica powder from tetraethylorthosilicate (TEOS) in an ethanol/water/ammonia mixture using a novel modification of the procedure orginally reported by Stober, Fink, and Bohn (26 *J. Colloid Interface Sci.* 62 [1968]) in accordance with the reactions:

$$Si(OEt)_4 + 4H_2O \rightarrow Si(OH)_4 + 4EtOH$$

$$Si(OH)_4 \rightarrow SiO_2 + 2H_2O$$

By selecting a proper reaction condition, silica particles with a mean diameter of 100 to 250 nm may be obtained.

Example A.1.1

Monodispersed silica particles of 0.10±0.02 μm in diameter as shown in FIG. 4A are obtained by mixing 2.0 liter dehydrated ethanol, 1.5 l distilled water, and 0.16 l of a 30 wt % solution of ammonium hydroxide (NH$_4$OH) at 40° C. for 15 min. Then, under vigorous stirring, 0.19 l TEOS plus 0.19 l dehydrated ethanol are added to the solution to obtain, after a few minutes, a milky white dispersion. The colloidal dispersion is kept overnight at 40° C. without stirring to complete the reaction.

Example A.1.2

Monodispersed silica particles of 0.16±0.02 μm in diameter (FIG. 4B) are obtained by aging a solution consisting of 0.045 l TEOS, 0.30 l dehydrated ethanol, 0.23 l distilled water, and 0.03 l of a 30 wt % solution of ammonium hydroxide at 40° C. for 1 h under mild stirring. The so-obtained silica dispersion is diluted at a ratio of 1:1 with deionized water and distilled at 80° to 90° C. to recover ethanol.

Example A.1.3

The recycled ethanol from Example A.1.2, obtained by distillation of a diluted silica dispersion, is used to produce silica, $0.10\pm0.03$ μm in diameter, by aging at 40° C. for 1 h, a solution consisting of 0.5 l recycled ethanol, 0,003 l ammonium hydroxide (30 wt %), 0.07 l water, and 0.04 l TEOS.

Before the particles are separated by centrifugation at 9000 rpm to produce a dry powder, the dispersion is diluted with water at a 1:1 ratio and the mixture is distilled at 80° to 90° C. to recover ethanol. After distillation, the concentrated aqueous dispersion is treated with diluted nitric acid to lower the pH from 8.8 to 7.5, and then reactants are added to yield a solution consisting of 0.001 mol $dm^{-3}$ potash alum ($KAl(SO_4)_2$), 0.002 mol $dm^{-3}$ aluminum nitrate ($Al(NO_3)_3$), and 0.2 mol $dm^{-3}$ urea. The so-prepared final dispersion is then aged at 90° C. for 40 min. This treatment with aluminum compounds destabilizes the silica dispersion so that the solids may be separated easily from the mother liquor either by sedimentation overnight, or by centrifugation, e.g. at 2000 rpm, or by filtering using a 0.45 μm pore size membrane. After being thoroughly washed with distilled water, the powder is redispersed easily in water and stored in Nalgene polypropylene bottles. The final concentration of the purified silica dispersion in water is about 20 g $dm^{-3}$.

Although the composition of the recycled solvent (which includes ethanol from TEOS hydrolysis, water and ammonia) varies in different batch runs as ethanol accumulates, we have found that the silica particles remain largely within the aforementioned size range through several recycling runs.

A.2 Cores of Yttrium Basic Carbonate and Aluminum Hydrous Oxide

Figure 5A:
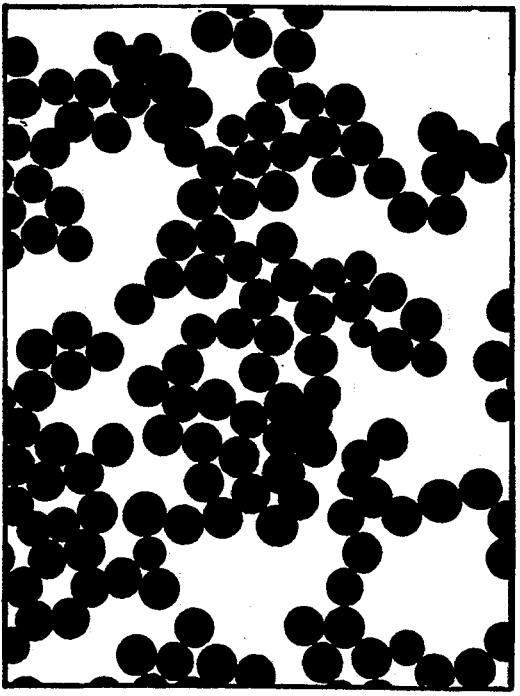
FIGS. 5A and 5B are inked reproductions of similar micrographs showing yttrium basic carbonate and aluminum hydrous oxide pigment cores made in accordance with the invention.
Figure 5B:
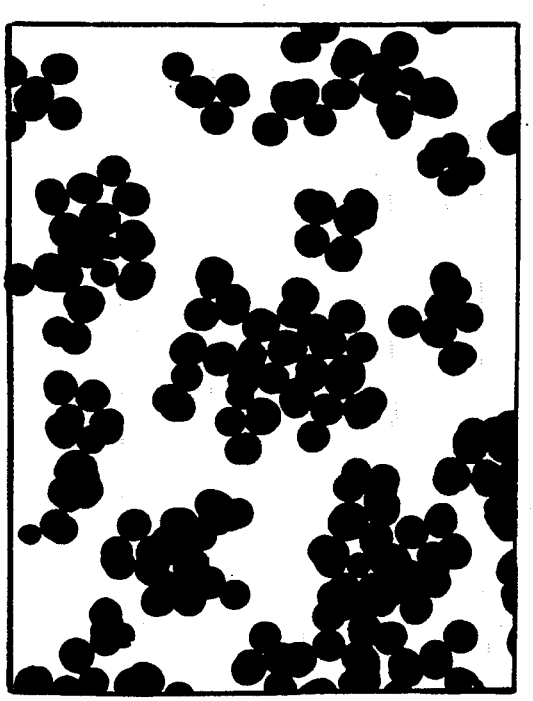

FIGS. 5A and 5B illustrate uniform spherical particles consisting of inorganic sols of yttrium basic carbonate ($Y(OH)CO_3$) and aluminum hydrous oxide, respectively. These particles may be prepared by aging solutions of appropriate salts and urea at elevated temperatures as described, for example, in the article by B. Aiken, W. P. Hsu and E. Matijevic in 71 *J. Am. Ceram. Soc.* 848 (1988). We have, however, introduced some modifications, as evident from the following examples:

Example A.2.1

Monodispersed yttrium basic carbonate particles of 0.30 μm in diameter are obtained by aging at 90° C. for 45 min a solution consisting of 0.005 mol $dm^{-3}$ ($Y(NO_3)_3$), and 0.50 mol $dm^{-3}$ urea under mild stirring. The so-obtained particles are separated by filtering using a 0.2 μm pore size membrane and washed with distilled water.

Example A.2.2

Aluminum hydrous oxide particles of 0.30 μm in diameter are obtained by aging at 90° C. for 45 min a solution consisting of 0.0018 mol $dm^{-3}$ $KAl(SO_4)_2$, 0.0032 mol $dm^{-3}$ $Al(NO_3)_3$, and 0.50 mol $dm^{-3}$ urea under mild stirring. The so-obtained particles are separated by filtering using a 0.2 μm pore size membrane and washed with distilled water.

B. Coloration Of The Core Particles

Dye stock solutions, in concentrations ranging from $1.0\times10^{-3}$ to $5.0\times10^{-3}$ mol $dm^{-3}$, were prepared in aqueous or ethanol/water (10 vol %) media. All stock solutions were filtered through 0.2 μm pore size membranes.

The so-prepared solutions of dyes are mixed with core particles to obtain pigments. The pigment particles are dispersed in ethanol, followed by ultrasonication and centrifuging. This procedure is repeated several times in order to establish the extent of dye leaching, if any, from the particles.

B.1 Cationic Dyes on Silica Cores

Figure 6:
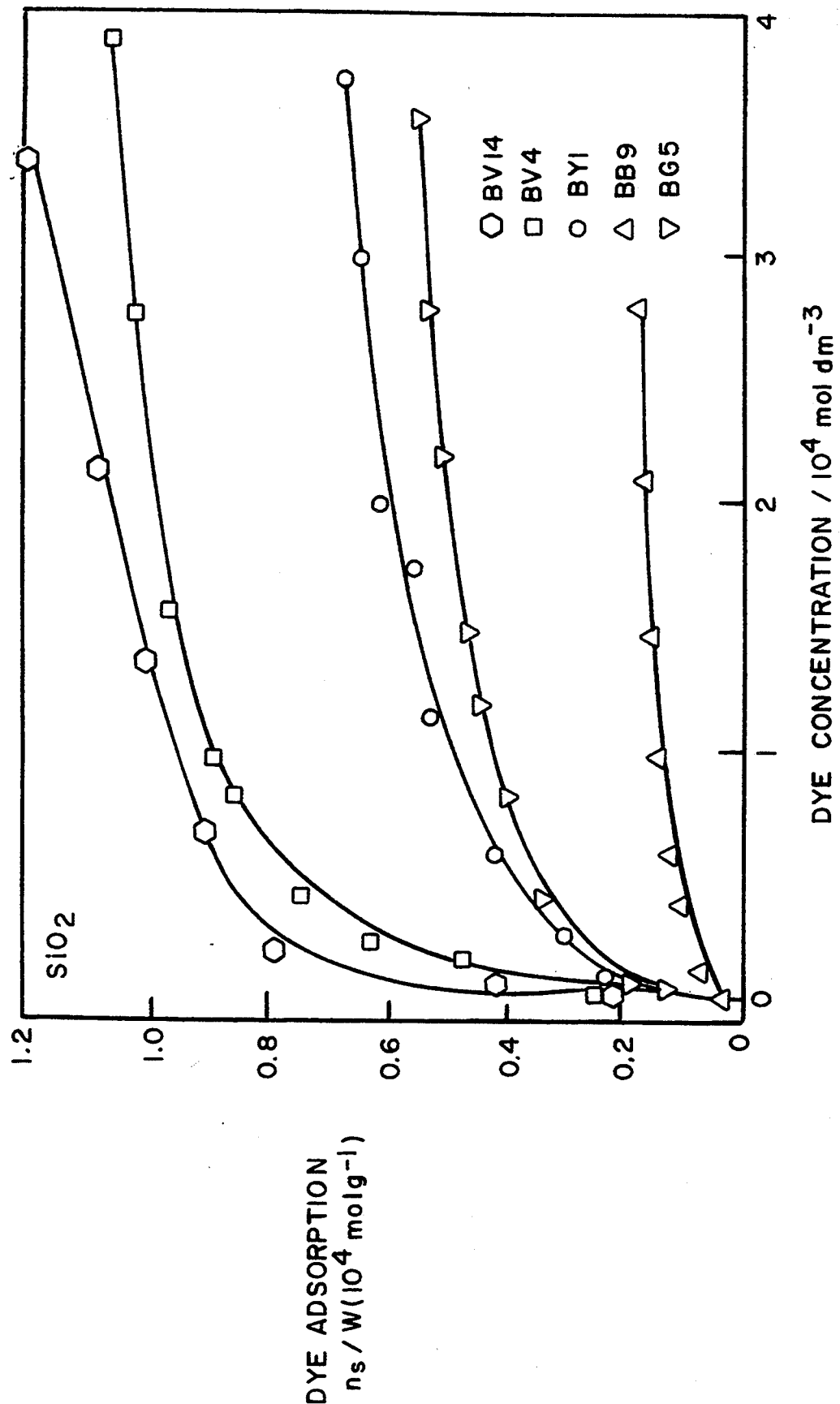
FIG. 6 depicts the isotherms for adsorption of certain dyes on silica cores according to the invention.

The amount of cationic dyes adsorbed on silica cores made as described above depends on the molecular structure of the dyes and on the pH of the solutions, which influence the surface charge of $SiO_2$; see M. M. Ailingham et al., 8 *J. Appl. Chem.* 108 (1958). As a rule, the uptake of dye molecules increases gradually as the solution pH becomes higher. The extents of different dyes adsorbed on silica particles varies according to their molecular orientations and dye aggregations on the surface. As shown in FIG. 6, the extent of dye adsorbed on silica in water at a pH of approximately 9 is in the order: Basic Violet 14 (BV14)>Basic Violet 4 (BV4)>Basic Yellow 1 (BY1)>Basic Blue 9 (BB9)>Basic Green 5 (BG5).

B.2 Anionic Dyes on Silica Cores

In order to prepare silica cores containing anionic dyes, the silica cores are coated with a first shell of an inorganic coating material which promotes the fixation of the anionic dye; see shell 16 in FIG. 3A. Among the several inorganic compounds, shown in the following Table I, aluminum hydrous oxide $Al(OH)_3$ is found to be a most efficient substrate for the dye-aluminum chelating complexes.

Exact formulations for the incorporation of anionic dyes are offered in the examples below. The dye fixing may be achieved by adsorption or by incorporation, as follows:

Example B.2.1 Adsorption Method

A 500 $cm^3$ dispersion of silica (20 g $dm^{-3}$) is mixed with 30 $cm^3$ of an urea stock solution (8.0 mol $dm^{-3}$ in a constant temperature bath (90° C.), to which is slowly added a fresh aluminum salt solution (50 $cm^3$) containing 0.2 mol $dm^{-3}$ $KAl(SO_4)_2$ and 0.3 mol $dm^{-3}$ $Al(NO_3)_3$ under gentle stirring during subsequent aging. The uniformity of the coating is affected by the pH of the dispersion; the optimum initial and final pH values are in the range 6.5 to 7.5. The rate of the added aluminum salt solution is maintained at 3 to 4 $cm^3$ per min. The amount of coating may be varied 0.2 wt % to 10 wt % of the silica by varying the amount and/or concentration of the coating solution, the necessary adjustments being determined readily by the skilled artisan.

After repeated washings with water, the so-prepared silica particles, coated with aluminum hydrous oxide, are redispersed readily in water and the final purified powder is collected and dried overnight in a desiccator.

Adsorption of anionic dyes in the cores is conducted by the addition of 5 g of the dried alumna-treated silica powder to aqueous dye solutions (100 $cm^3$) of known concentrations. The dispersions are kept in an ultrasonic bath for 5 min and the resulting colored pigment particles may then be separated by centrifugation at 3000 rpm for 20 min and washed several times with distilled water.

B.2 Incorporation Method

If one desires to first incorporate, rather than adsorb, anionic dyes into the aluminum hydrous oxide shell of silica particles, a silica dispersion (5 g dm$^{-3}$) containing 0.01 to 0.03 mol dm$^{-3}$ KAl(SO$_4$)$_2$, 0.01–0.05 mol dm$^{-3}$ Al(NO$_3$)$_3$, 0.40–0.60 mol dm$^{-3}$ urea, and 0,001–0.005 mol dm$^{-3}$ acid dye, is aged at 90° C. for 1 hr under gentle stirring. For silica concentrations higher than 10 g dm$^{-3}$, the coating is preferably carried out by a slow addition of the aluminum salt solution, similar to the procedure described in Example B.2.1 above, except that the silica dispersion also contains dye molecules and urea.

The anionic dyes used in fixations with aluminum ions may vary greatly in chemical composition. Preferably, dyes having chelating properties, such as those containing o,o'-dihydroxy azo or salicylic groups in their structures are used. Based on the extent of the dye fixation, as determined by the appearance of color, they may be classified into two groups A and B. The dyes of group A are readily incorporated in the aluminum hydrous oxide layer or shell by either of the described procedures. With the dyes of group B, the colors of the pigments obtained by Incorporation are much weaker than those prepared by Adsorption. The formation of dye aggregates and/or dehydration of the alumina layer appear to promote dye fixations in the latter case. Examples of the dyes of the two groups that may be used in our pigment syntheses are:

| Group A | Group B |
| --- | --- |
| Acid Blue (AB) and 249 | Acid Yellow (AY) 1, 29 and 99 |
| Acid Red (AR) 66 | Acid Blue (AB) 40, 45 and 93 |
| Mordant Blue (MB) 3, 9 and 10 | Acid Red (AR) 73 and 183 |
| Solvent Yellow (SY) 21 | Acid Violet (AV) 7 and 9 |
| Solvent Red (SR) 8 | Acid Black (AB) 2 |
| Solvent Black (SB) 35 | Mordant Red (MR) 29 |
| Direct Yellow (DY) 11 | |

Figure 7:
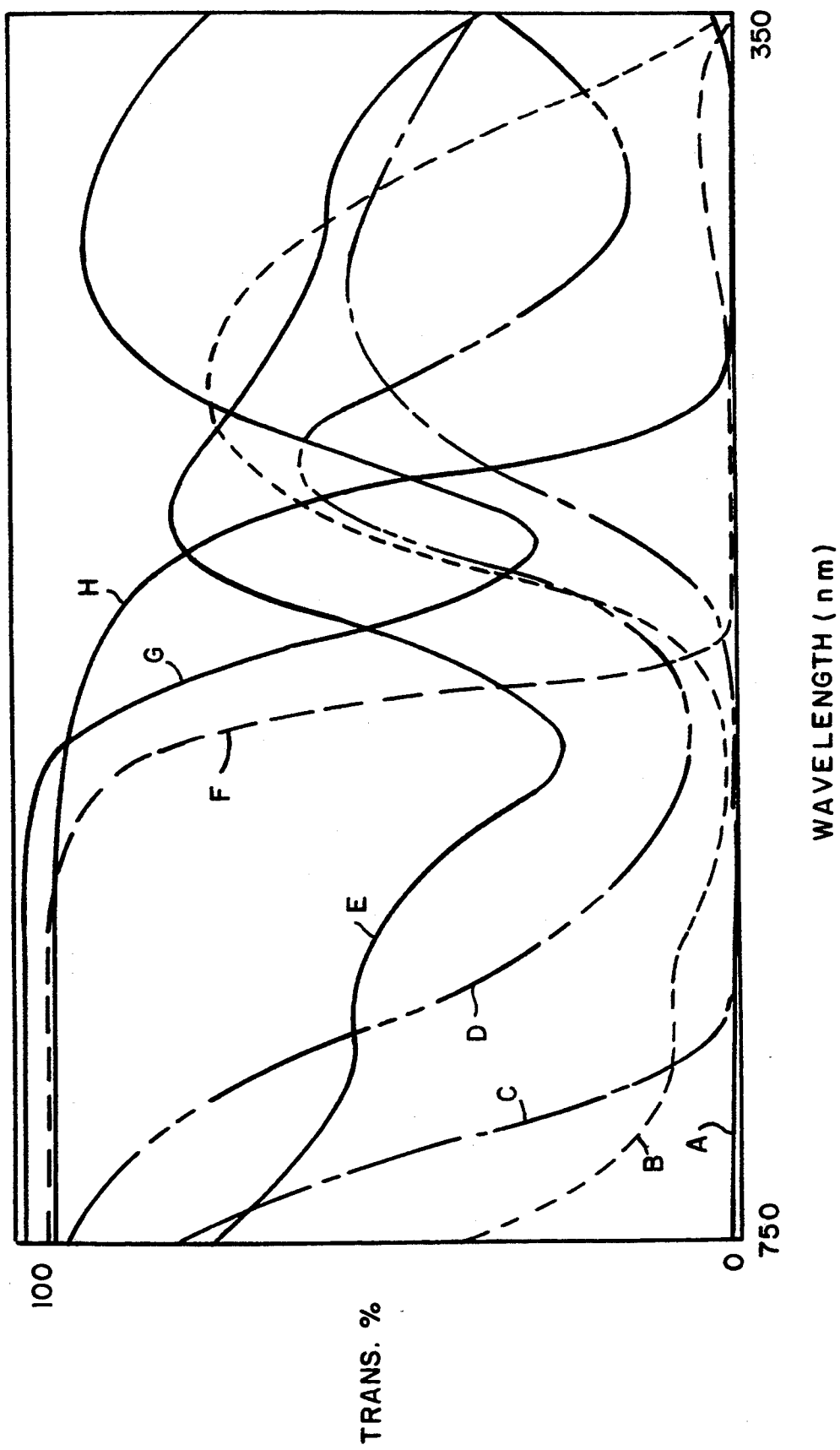
FIG. 7 shows the transmittance spectra of dye-silica pigments made according to the invention.
Figure 8:
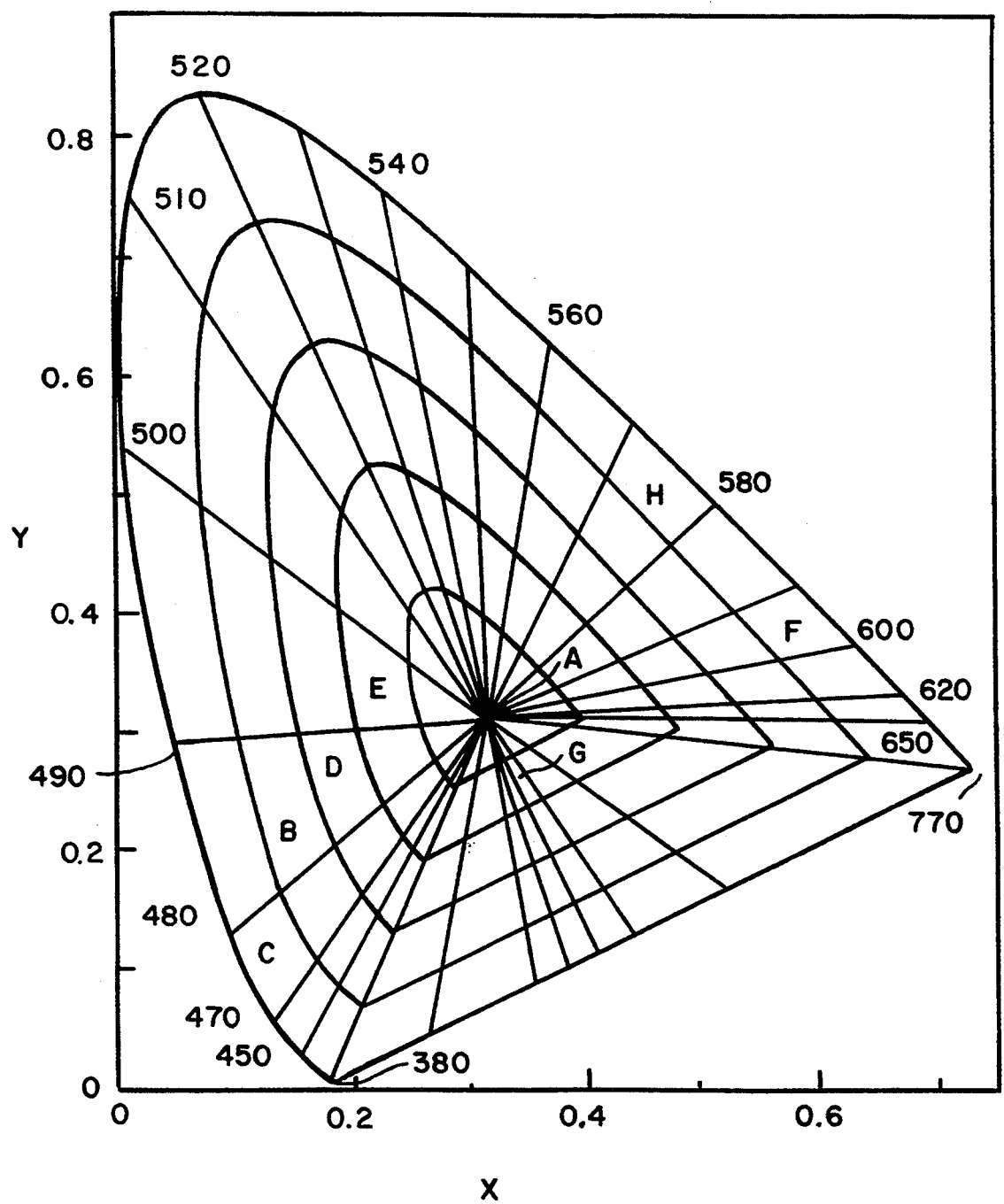
FIG. 8 is a chromaticity diagram relating to the FIG. 7 pigments.

FIG. 7 gives the transmittance spectra of eight pigments labelled A to H prepared by the Incorporation method and for which the corresponding chromaticity data are shown in FIG. 8. Obviously, by attaching different functional dyes to the alumina shells of the silica particles, it is possible to obtain pigments of varying optical properties.

B.3 Anionic Dyes on Yttrium Basic Carbonate and Aluminum Hydrous Oxide Cores In order to prepare the said particles containing anionic dye molecules, the corresponding reactants (metal salts and urea) and dye solutions of appropriate concentrations are mixed to give a constant final volume and then aged at elevated temperatures for a desirable period of time.

Yttrium basic carbonate and aluminum hydrous oxide interact with dyes having chelating properties, such as those containing o,o'-dihydroxy azo (Acid Red 183, Acid Yellow 99, and Mordant Blue 9) or salicylic groups (Mordant Blue 3 and 29, Mordant Red 3, and Acid Blue 45) in their structures.

Example B.3.1

Using yttrium basic carbonate as the core material, magenta particles of 0.1 μm in diameter are obtained by aging at 85° C. for 60 min a solution consisting of 0.02 mol dm$^{-3}$ Y(NO$_3$)$_3$, 0.50 mol dm$^{-3}$ urea and 0.1×10$^{-3}$ to 0.2×10$^{-3}$ mol dm$^{-3}$ Mordant Blue 3 (MB3) under mild stirring. The resulting colored particles are filtered and washed with distilled water until no dye can be detected in the filtrate.

Figure 9:
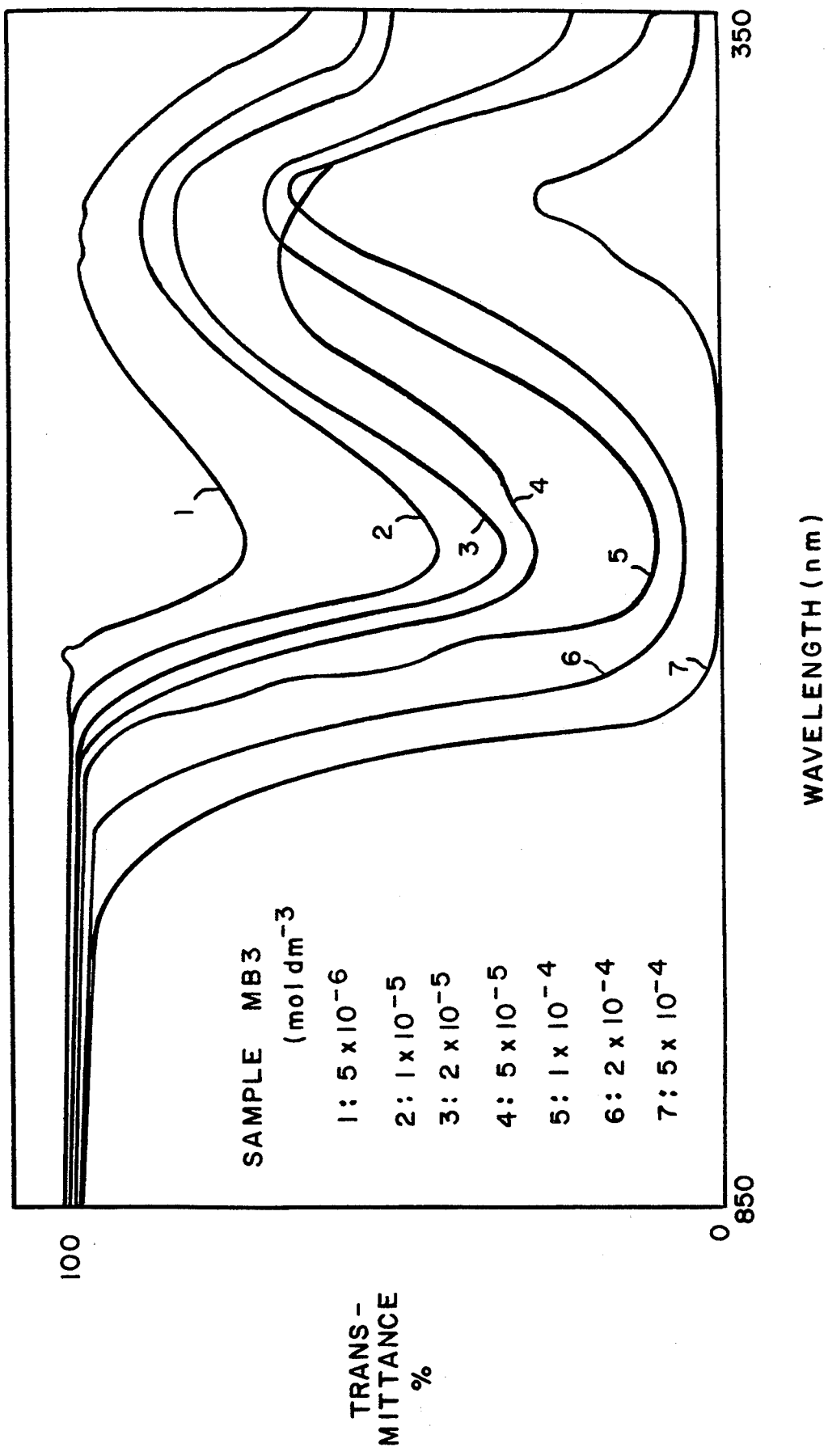
FIGS. 9 and 10A to 10L show the transmittance spectra of other pigments made according to the invention.
Figure 10A:
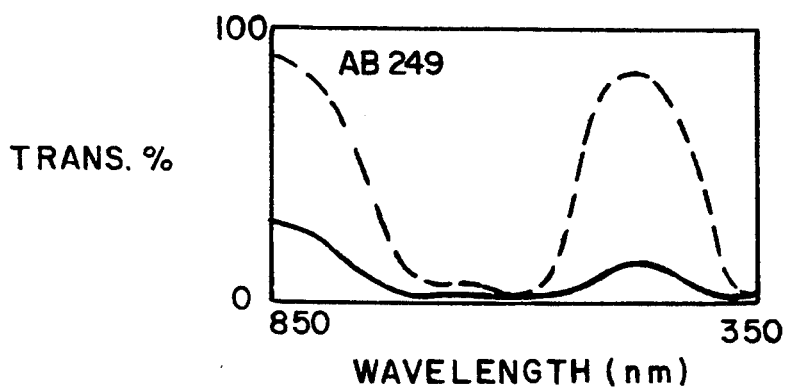
Figure 10B:
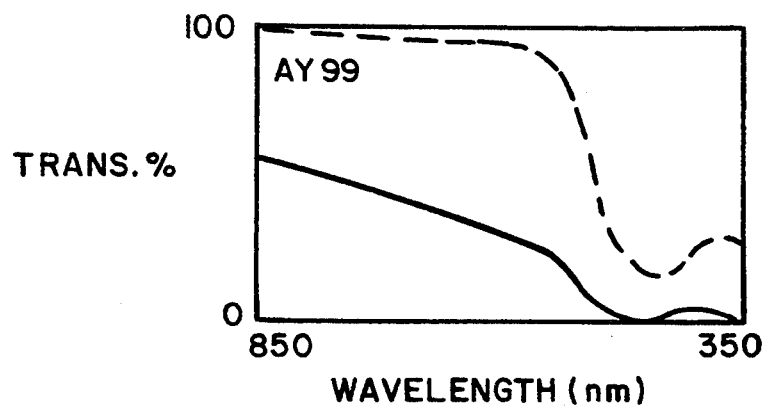
Figure 10C:
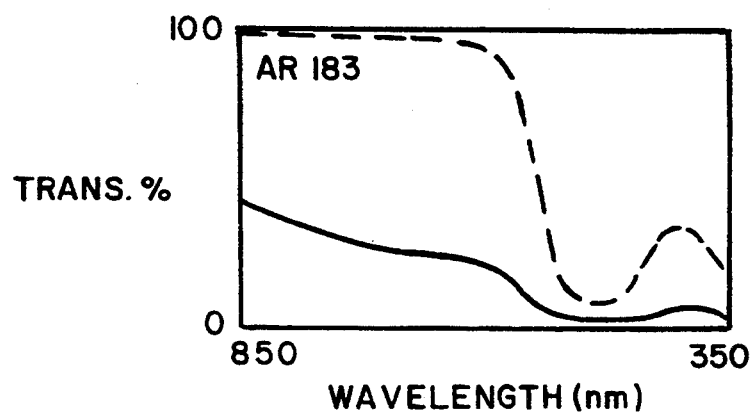
Figure 10D:
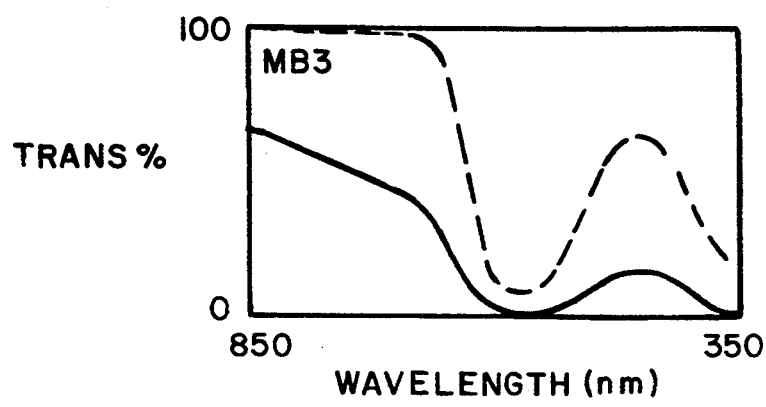
Figure 10E:
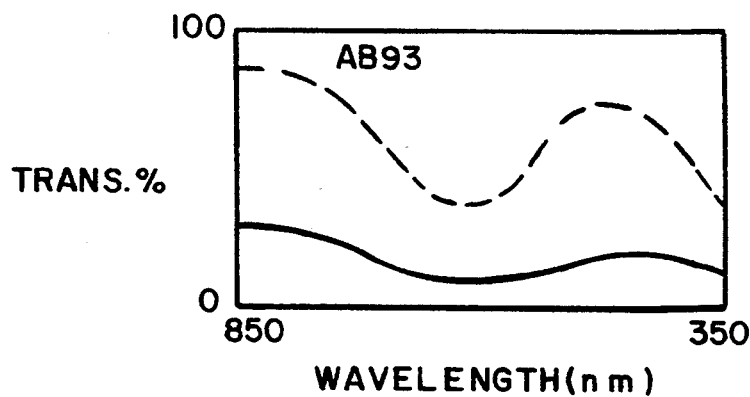
Figure 10F:
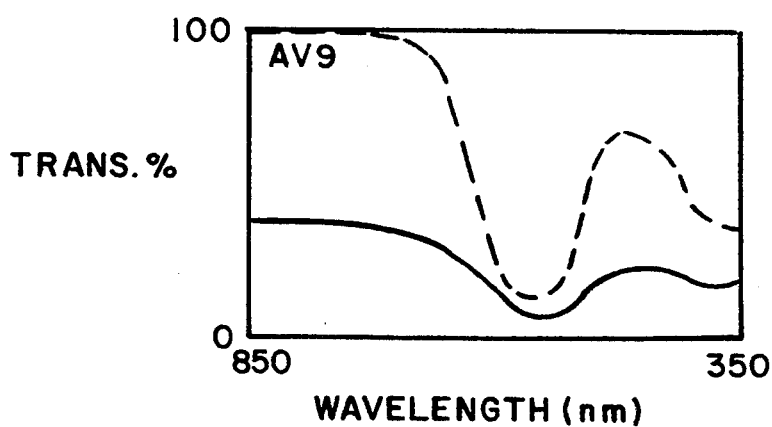
Figure 10G:
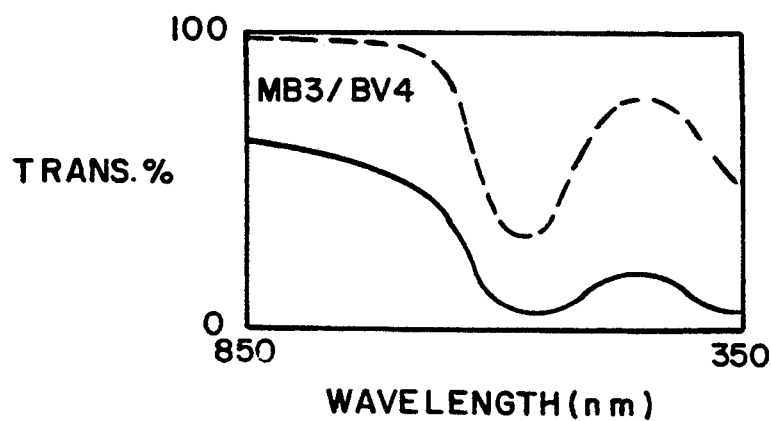
Figure 10H:
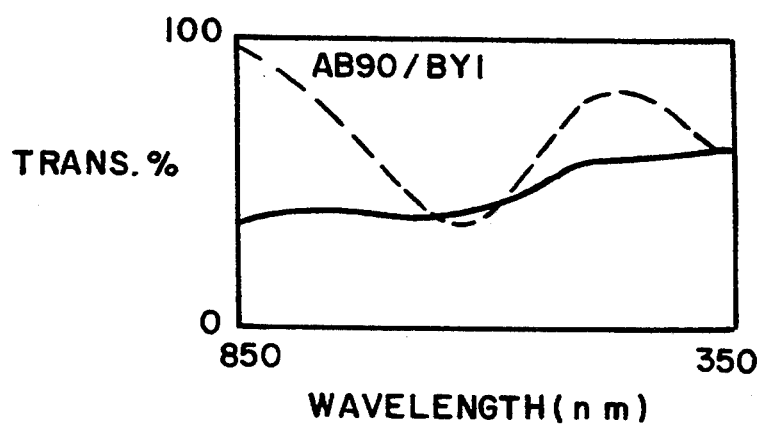
Figure 10I:
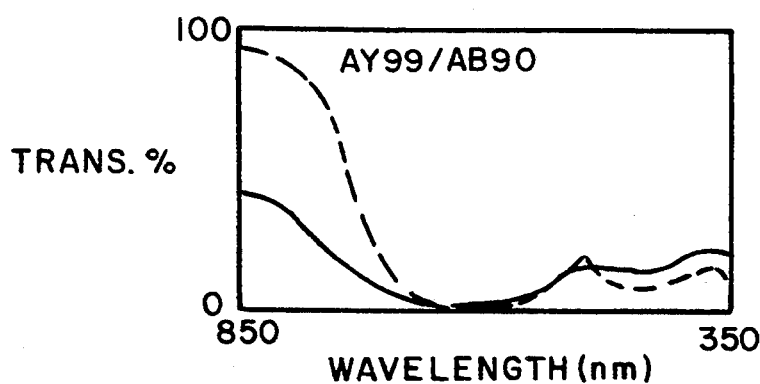
Figure 10J:
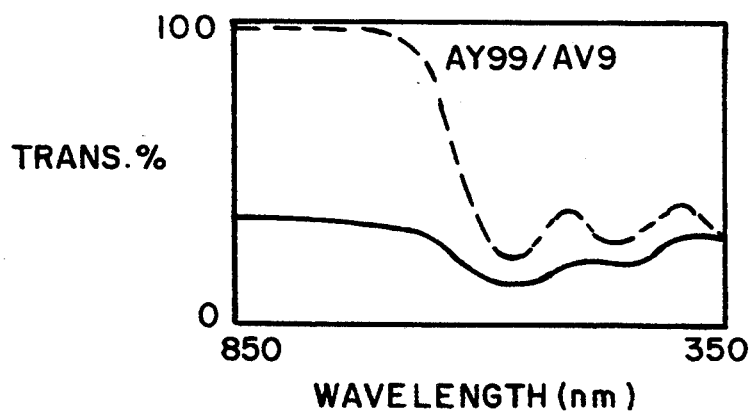
Figure 10K:
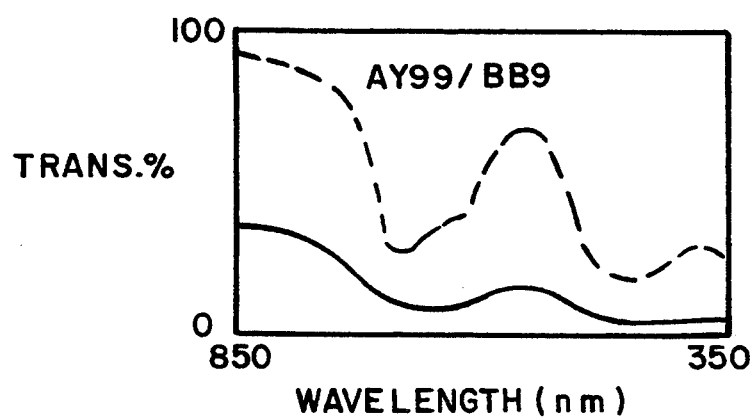
Figure 10L:
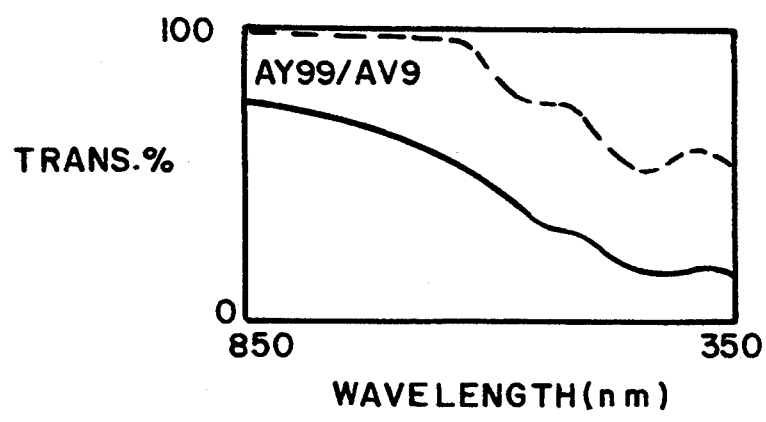

The color purity of the magenta particles may be optimized by varying the dye concentrations. FIG. 9 shows the transmittance spectra representing seven different magenta colors obtained from the said pigments containing different amounts of MB3 (ranging from 5×10$^{-6}$ to 5×10$^{-4}$ mol dm$^{-3}$) dispersed in chloronaphthalene. The relative purity among the said pigments, as indicated by the sharpness of the peaks in the violet region (390 to 420 nm), shows the optimum dye concentration to range from 0.1×10$^{-3}$ to 0.2×10$^{-3}$ mol dm$^{-3}$.

Example B.3.2

Figure 11:
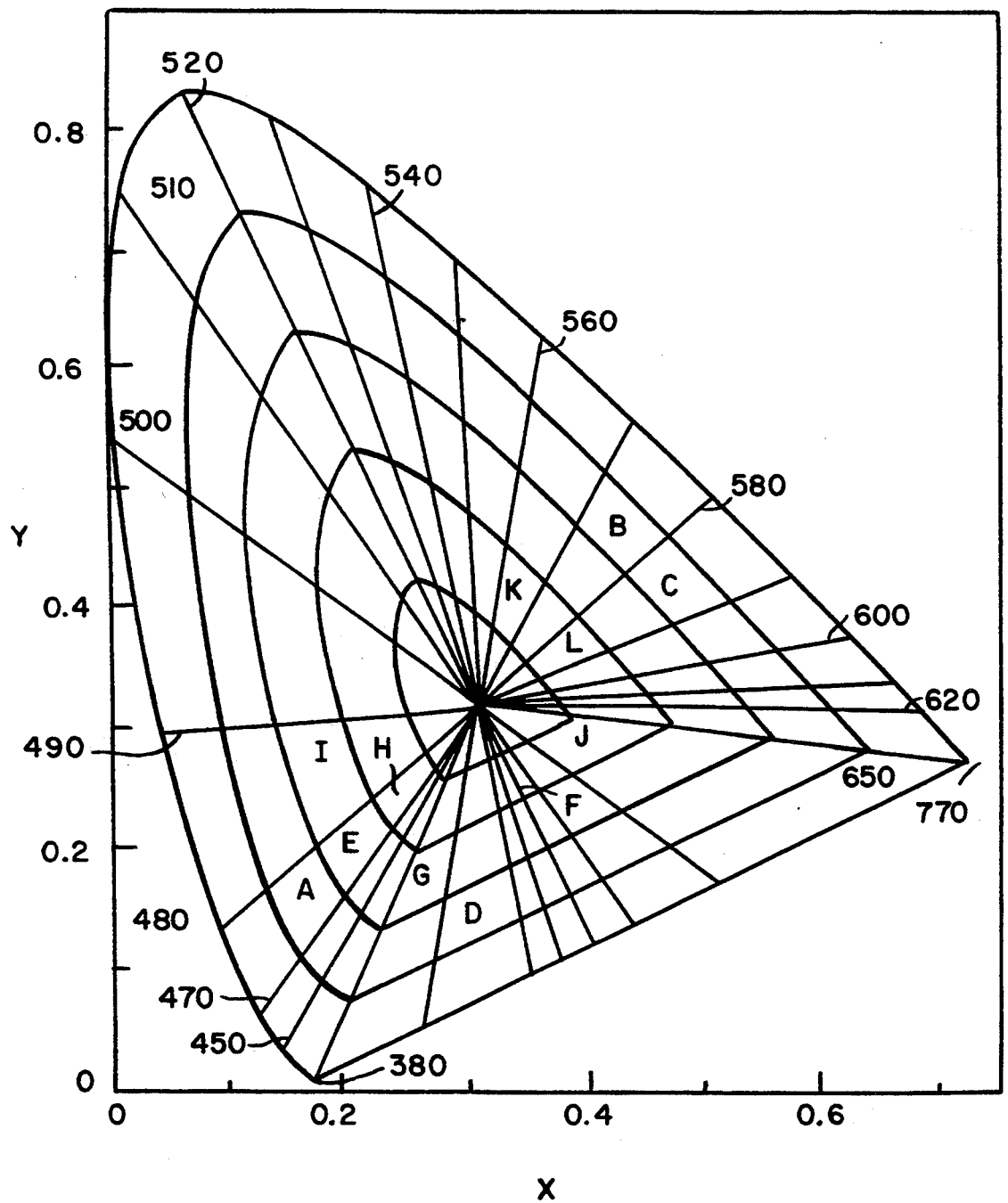
FIG. 11 is a chromaticity diagram for the pigments represented in FIGS. 10A to 10L.

Example B.3.1 is repeated, except that different dyes or dye mixtures, ranging from 0.1×10$^{-3}$ to 0.2×10$^{-3}$ mol dm$^{-3}$ in concentration, are added, using the same reactant concentrations and temperature. A wide variety of hues shown in the transmittance spectra depicted in FIG. 10 and the corresponding chromaticity diagram depicted in FIG. 11 is also obtainable through this procedure.

Example B.3.3

With aluminum hydrous oxide as the core material, pigments of various hues are also obtained by aging at 90° C. for 45 min solutions consisting of 0.0018 mol dm$^{-3}$ KAlSO$_4$, 0.0032 mol dm$^{-3}$ Al(NO$_3$)$_3$, and 0.40 mol dm$^{-3}$ urea with different dye solutions ranging from 0.1×10$^{-3}$ to 0.2×10$^{-3}$ mol dm$^{-3}$ in concentration.

The particle size of pigments, prepared by coprecipitation as described above, differs in most cases from the size of the core particles obtained under the same conditions in the absence of dyes. To obtain uniform pigments, adsorption of anionic reactive dyes on pre-existing particles is carried out for the sols obtained from Example A.2.1 or A.2.2.

Example B.3.4

Adsorption of anionic dyes is conducted by the addition of 5 g of the dried powders of yttrium basic carbonate of Example A.2.1 or aluminum hydrous oxide of Example A.2.2 to aqueous dye solutions (100 cm$^{-3}$) of known concentrations (0.1×10 to 1.0×10$^{-3}$ mol dm$^{-3}$). The dispersions are kept in an ultrasonic bath for 5 min and the resulting colored particles are then separated by centrifugation at 3000 rpm for 20 min and washed several times with distilled water.

C. Protective Coatings of Pigments

The pigment particles can be further coated by inorganic or organic compounds in order to improve pigment stability (e.g., tolerance of heat and the action of solvents), prevent dye leaching, control surface charge, minimize alumina dissolution and increase compatibility with the polymer substrate; see layer 18 in FIG. 3A. A variety of coating systems may be used for these purposes. Preferably, polymer coatings are used to insure a uniform non-porous coverage of the pigment particles and, in some cases, to introduce an electrical charge.

Example C.1

The pigment powder (10 g dm$^{-3}$) is first dispersed in 0.5 l water which is then admixed with a 5 cm$^3$ styrene or methyl methacrylate monomer. After the addition of 0.1 cm³ of azo-bis-isobutyronitrile and 0.1 sodium bicarbonate, the dispersion is aged at 65° C. for 1 h under gentle stirring. The floating pigment particles are then separated by skimming and repeatedly washed with ethanol. A small amount of a drying agent (e.g., an aliphatic amine) may be used if necessary. The filtered powder is stored in a vacuum desiccator.

Example C.2

The pigment powder can be coated with a cross-linked polymer, such as polystyrene (PS) or PS/polymethylmethacrylate (PMMA) copolymer, by the addition of divinylbenzene (DVB) to the system described in Example C1.

Example C.3

To induce proper surface charges on the coated polymer layer or shell of the pigment particles, a suitable ionic polymer (polyelectrolyte) such as polyacrylic acid or polymethacrylic acid, can be introduced and polymerized according to Examples C.1 and C.2. This changes the ionic groups at the sulfate of the pigment particles producing ionic tails, shown diagrammatically at 20 in FIG. 3A, thereby enabling control of the surface charges on the particles. Other suitable charge-control agents are well-known to those skilled in the art.

D. Pigments with Opaque Whitener Layers

If the pigment is to be used in a surface coating to hide or decorate an underlying substrate surface, it is desirable to provide each pigment particle with an opaque whitener layer underneath the dye layer; see layer 19 in FIG. 3B. A layer of titania or magnesium is advantageous. An undercoating may be provided on the core particles to improve the compatability of the core particles for the whitener. For example, an aluminum hydrous oxide precoat applied as in Example B2 provides bonding affinity for titanium whitener compounds.

The degree of "hiding power" on opacity of the finished whitened particles depends, amoung other things, on the size of the particles, their shape, the thickness and uniformity of the opaque shells and the refractive indices of the core particles and shells; the opaque shell preferably has a high index of refraction that differs substantially from that of the core.

The whitener coating 19 (FIG. 3B) may be added to prepared particles by hydrolysis and precipitation of titanyl surface (TiOSO₄) to form a layer of titanium hydrous oxide, which may be calcined to form titania. For this, a stock solution of 0.2 mol dm⁻³ TiOSO₄ is prepared and filtered through a membrane having a pore size of 0.2 micrometer. This solution is added to an aqueous dispersion of prepared cores. The uniformity of the coating is affected by the initial and final pH values of the dispersion, the correct ratio and surface treatment of the core particles, the rate of additon at the TiOSO₄ stock solution, the degree of stirring and the reaction volume.

The coated particles are recovered from the reaction mixture by filtering. The collected particles are then washed with distilled water until the supernatent solution reaches pH 4–5. The particles may then be redispersed in water with the addition of a reactant such as a diluted (0.0001 mol dm⁻³) solution of NaOH. After filteration and repeated washings, the particles may then be dried and calcined (e.g., at 1000° C.) to form opaque whitener shells 19 on the core particles. Then, if desired, the particles may be color coated as described above.

E. Polymer Based Carrier

Generally, the carrier for the pigments described herein should be a clear thermoplastic polymer. Preferably, the polymer should have substantially the same index of refraction as the pigment and the pigment should be dispersed uniformly in the carrier. Resultantly, when the carrier is in its solid state, the combination of pigment and carrier results a highly transparent, thermoplastic colored article which can be formed in a variety of colors, sizes and shapes. On the other hand, when the carrier is in its liquid state, the combination can be applied as a coating to hide and/or to decorate the surfaces of substrates or to produce printed image patterns or characters thereon.

In the case of inks, the polymer carrier for the pigment plays an important role in (a) ink transfer; (b) ink purity in color mixing; and (c) light transmission and glossy appearance as described in detail in the above copending application. To obtain a functional ink vehicle which responds to the electric field from the print cylinder, the polymer-based substrate is designed according to its chemical (thermoplastic), dielectric (permittivity), thermal (glass transition and melting temperatures), optical (transmission, refractive index), and viscoelastic (molecular weight distribution) properties.

The components which constitute the carrier are shown in the following examples:

Example E.1

A low molecular-weight polymethylmethacrylate (PMMA) is prepared by mixing 5 g of the polymer coated pigment particles in 100 cm³ distilled methylmethacrylate monomer in the presence of 0.1 g azo-bis-isoburyronitrile initiator) and 0.5–3.0 cm purified dibutyl phthalate (plasicizer) in a dispersion mixer. Depending upon the amount of the added plasticizer, the reaction time may range from 3 to 5 hrs at 70° C. The addition of the plasticizer lowers the molecular weight and the degree of polymerization which results in a desired condition (lower melting temperature, viscosity, and refractive index, but higher dielectric constant). Also, a small amount of an acid monomer, such as methacrylic acid, can be introduced to increase the polarity of the system.

Example E.2

A copolymer, such as PMMA/PBMA (polybutylmethacrylate), PMMA/PS, or PBMA/PS, can be prepared by using the corresponding monomer mixtures under experimental conditions similar to Example E.1.

It is important to appreciate that the above described methods of making colored pigment particles are highly controllable. During each step in the synthesizing of the pigment core and shells, the concentration of the reactants, the process temperature, the aging time in the reactor, etc. can be controlled very precisely. Consequently, the resultant product produced during each stage of the process is very predictable. For example, the pigment cores will all have essentially the same composition, size and shape. Also, since the dye or dye mix is prepared before being applied to the cores and is adsorbed or incorporated into or onto the cores under controlled conditions, all of the pigment particles will have exactly the same color and hue. The same is true with respect to the other functional shells that are applied to the cores.

F. Production Process and Apparatus

Figure 12:
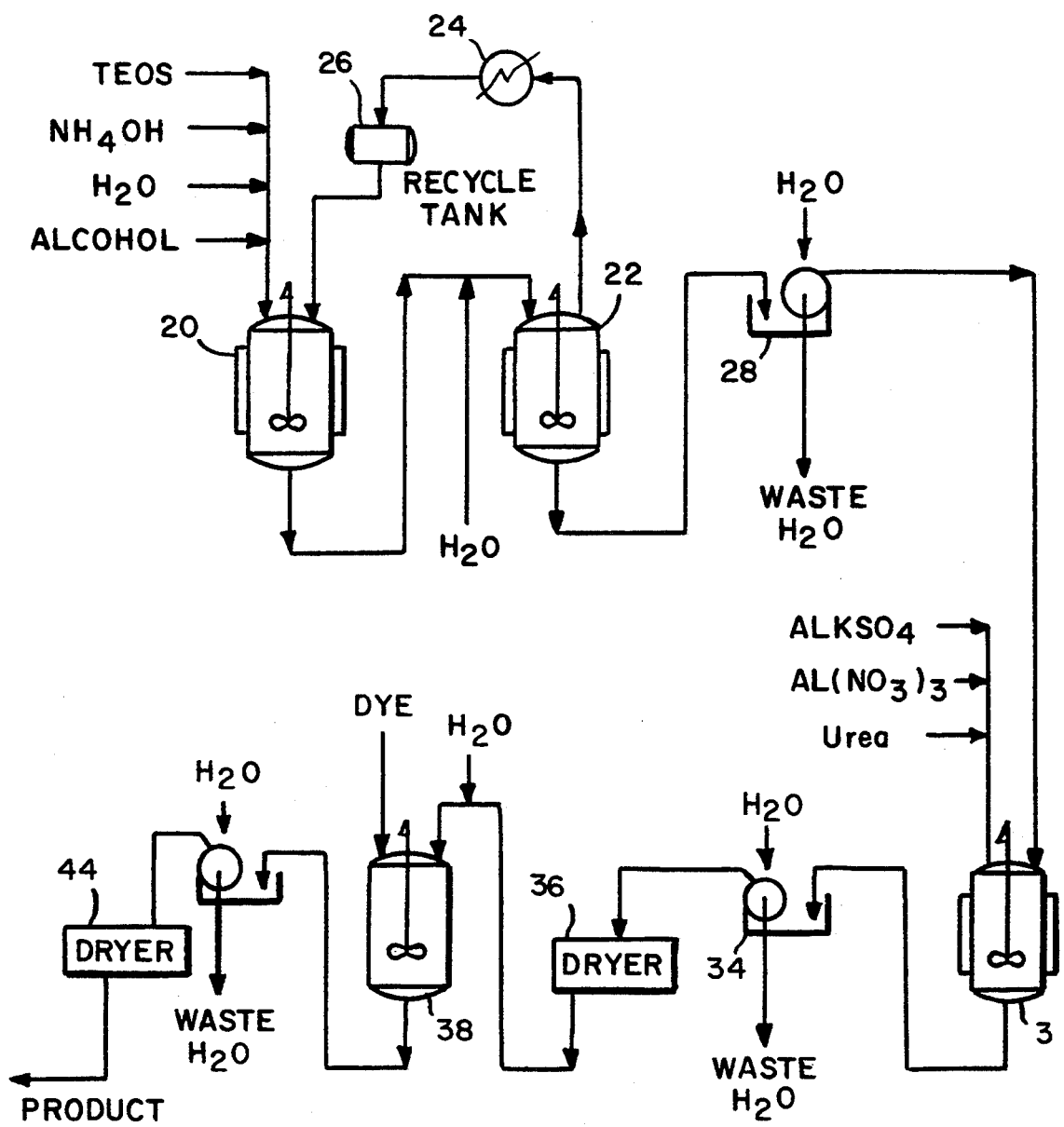
FIG. 12 is a diagrammatic view of a process line for making color pigments according to this invention.

Pigments may be prepared as above on a production line capable of performing the necessary synthesis steps. One such line for producing pigments with silica cores is illustrated in FIG. 12.

The initial ingredients, i.e. TEOS, $NH_4OH$, $H_2O$ and alcohol may be combined in reactor 20 to form silica cores according to Examples A.1.1 to A.1.3. Core particles are separated from the mixture and the solvent (or portions thereof) may be recovered for reuse in a distillation stripper 22 which returns solvent fractions to reactor 10 via a condenser 24 and a holding tank 26. Distilled water to dilute the silica dispersion may be introduced at the input to stripper 22.

After distillation, the concentrated silica dispersion is fed to a rotary filter 28 where it is continuously filtered and may be mixed with distilled water until the pH is lowered sufficiently to accommodate further processing. The silica dispersion is then fed to a reactor 32 where the $KAlSO_4$, $Al(NO_3)_3$ and urea reactants may be mixed and added to prepare the silica core particles to receive dye as described above. The treated particles are then washed and filtered in a rotary filter 34 and dried in a dryer 36.

Following redispersion in distilled water, the treated particles are introduced into a dye adsorber vessel 38 which receives dye solution as described in section B.1 or B.2 above. After aging in vessel 38, the resultant pigment particles 10 are washed and filtered in rotary filter 42 and dried in dryer 44.

If the pigment particles are to be provided with a further coating 18 as described in Example C.1 or C.2 and shown in FIG. 3A, the pigment particles, after being dispersed in distilled water, are fed to a mixing vessel (not shown) where they are mixed with monomer and aged as described in those examples. After being skimmed from that vessel, the coated pigment particles are washed and dried.

It will be seen from the foregoing that the objects set forth above, among those made apparent from the preceding description, are efficiently attained and, since certain changes may be made in carrying out the above process steps, and in the products described without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention described herein.

We claim:

1. A method of making color pigment adapted for use in a carrier material having a selected refractive index, the method comprising the steps of
   precipitating, from a first solution, monodispersed colloidal core particles having substantially uniform size and shape, and a refractive index that substantially matches that of the carrier material,
   applying the exact amount of dye material to said core particles from a second solution necessary to achieve a desired color value, and
   dispersing the dyed core particles in the carrier material.

2. The method defined in claim wherein the precipitating step comprises hydrolyzing TEOS in a solvent including alcohol, water and ammonia so as to precipitate core particles of silica.

3. The method defined in claim 2 wherein
   the dye material is selected to be cationic, and
   the dye material is applied by adsorbing the dye onto said core particles.

4. The method defined in claim 2 including the steps of
   applying shells of inorganic fixation material to the core particles prior to applying said dye material, and
   applying an anionic dye material to the core particles by adsorbing it onto or incorporating it into said shells.

5. The method defined in claim 4 wherein aluminum hydrous oxide is applied as the inorganic fixation material.

6. The method defined in claim 1 and including the additional step of applying an electric charge control agent to the surfaces of the pigment.

7. The method defined in claim 6 wherein a polyelectrolyte is applied to the pigment.

8. The method defined in claim 7 wherein the polyelectrolyte is polyacrylic acid or polymethacrylic acid.

9. The method defined in claim 1 wherein the precipitating step comprises mixing and aging a solution of yttrium nitrate and urea so as to produce core particles of yttrium basic carbonate.

10. The method defined in claim 9 wherein
    the dye material is selected from those having chelating properties, and
    the dye material is applied by adding it to the yttrium nitrate and urea during the precipitating step.

11. The method defined in claim 10 and including the additional step of applying a projective nonporous stabilizing barrier surface coating to the dyed core particles.

12. The method defined in claim 11 wherein the surface coating comprises an organic polymer.

13. The method defined in claim 11 including the additional step of applying an electric charge control agent to the surfaces of the pigment.

14. The method defined in claim 1 wherein the precipitating step comprises mixing and aging a solution of potash alum, aluminum nitrate and urea so as to produce core particles of aluminum hydrous oxide.

15. The method defined in claim 14 wherein
    the dye material is selected from those having chelating properties, and
    the dye material is applied by adding it to the potash alum and aluminum nitrate and urea during the precipitating step.

16. The method defined in claim 15 including the additional step of applying an electric charge control agent to the surfaces of the pigment.

17. The method defined in claim 1
    wherein an organic dye material is applied to the core particles, and
    including the additional step of applying an electric charge control agent to the surfaces of the pigment.

18. The method defined in claim 1 including the additional step of applying a layer of high opacity material to the core particles prior to applying said dye material.

19. The method defined in claim 18 wherein the high opacity material applied is titania.

20. The method defined in claim 1 and including the additional step of dispersing the pigment in a clear polymer carrier medium having substantially the same index of refraction as the pigments enabling production of a highly transparent colored article.

21. The method defined in claim 13 and including the additional step of dispersing the pigment in a clear polymer carrier medium having the same index of refraction as the pigment to form a coating supply from which a field strength-proportional amount of the supply can be extracted by an electric field emanating to the supply.

22. A method of making a synthetic color pigment of a selected color comprising the steps of
   synthesizing a multiplicity of monodispersed colloidal core particles having substantially the same size, shape and composition;
   mixing a plurality of dyes to achieve said selected color;
   applying said dye mix to the core particles whereby each of said core particles has the selected color; and
   dispersing the dyed core particles in a carrier material having a refractive index substantially matching that of the core particles.

23. The method defined in claim 22 wherein a cationic dye ink is applied to the core particles by adsorption.

24. The method defined in claim 23 and including the additional step of applying fixation material to the core particles before applying the dye mix thereto.

25. The method defined in claim 24 wherein dye mix is applied to the core particles by adsorbing an anionic dye mix into the fixation material.

26. The method defined in claim 24 wherein the dye mix is applied to the core particles by incorporating the dye mix into the fixation material as that is applied to the core particles.

27. The method defined in claim 22 and including the additional step of applying an electric charge control agent to the surfaces of the dyed core particles.

28. The method defined in claim 22 including the additional step of applying a layer of high opacity material to the core particles prior to applying said dye mix to the core particles.

29. The method defined in claim 28 wherein the high opacity material applied is titania.

30. A synthetic color pigment adapted for use in a carrier material having a selected refractive index, the pigment comprising myriad monodispersed colloidal core particles having substantially uniform size and shape and a refractive index that substantially matches that of the carrier material, and color shells on the core particles consisting of dye material from the same dye batch.

31. The pigment defined in claim 30 and further including an electric charge control agent on the coated surfaces of the dyed particles.

32. The pigment defined in claim 30 wherein
   the core particles are substantially spherical and are of an inorganic material, and
   the color shells are of an organic dye material.

33. The pigment defined in claim 32 wherein the core particle material is selected from the group consisting of silica, ammonium hydrous oxide and yttrium basic carbonate.

34. The pigment defined in claim 32 wherein the dye material has chelating properties.

35. The pigment defined in claim 32 and further including nonporous stabilizing barrier surface coatings covering the color shells on the core particles.

36. The pigment defined in claim 30 and further including layers of opaque material on the core particles underneath the color shells.

37. The pigment defined in claim 36 wherein the opaque material is titania.

38. The pigment defined in claim 30 and further including a clear polymer carrier medium having the same index of refraction as the pigment and in which the pigment is dispersed enabling production of a highly transparent colored article.

39. The pigment defined in claim 31 and further including a clear polymer carrier medium having the same index of refraction as the pigment and in which the pigment is dispersed to form a coating supply from which a field strength-proportional amount of the supply may be extracted by an electric field emanating to the supply.

* * * * *